(12) United States Patent
Anjum et al.

(10) Patent No.: US 10,740,339 B2
(45) Date of Patent: Aug. 11, 2020

(54) QUERY TERM WEIGHTING

(71) Applicant: Microsoft Technology Licensing, LLC, Redmond, WA (US)

(72) Inventors: Nadeem Anjum, Santa Clara, CA (US); Skylar Payne, Sunnyvale, CA (US); Jerry Lin, San Jose, CA (US); Benjamin John McCann, Mountain View, CA (US); Erik Eugene Buchanan, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 231 days.

(21) Appl. No.: 15/845,477

(22) Filed: Dec. 18, 2017

(65) Prior Publication Data
US 2019/0188273 A1 Jun. 20, 2019

(51) Int. Cl.
*G06F 16/33* (2019.01)
*G06F 16/2457* (2019.01)
*G06F 16/248* (2019.01)

(52) U.S. Cl.
CPC ...... *G06F 16/24578* (2019.01); *G06F 16/248* (2019.01); *G06F 16/3334* (2019.01)

(58) Field of Classification Search
CPC .................................................. G06F 16/3334
USPC ........................................ 707/752, E17.084
See application file for complete search history.

(56) References Cited

U.S. PATENT DOCUMENTS

| 2009/0259647 | A1* | 10/2009 | Curtis ................. G06F 16/9535 |
| 2009/0265334 | A1* | 10/2009 | Narayanan ............. G06F 16/58 |
| 2012/0226529 | A1* | 9/2012 | White .................... G06Q 10/00 705/7.42 |
| 2016/0070705 | A1* | 3/2016 | Chevalier ............. G06F 16/248 707/728 |
| 2016/0378865 | A1* | 12/2016 | Makhani ................ G06Q 50/01 707/721 |
| 2019/0087472 | A1* | 3/2019 | Dong ................ G06F 16/24578 |
| 2019/0121855 | A1* | 4/2019 | Alexander .......... G06F 17/2785 |

* cited by examiner

*Primary Examiner* — Baoquoc N To
(74) *Attorney, Agent, or Firm* — Schwegman Lundberg & Woessner, P.A.>

(57) ABSTRACT

Systems and methods for query term weighting are disclosed. A server receives a search query for employment candidates, the search query comprising a set of parameters, each parameter having a weight. The server generates, from a data repository storing records associated with professionals, a first set of search results based on the set of parameters and the weights of the parameters in the set. The server transmits the first set of search results. The server receives a response to search result(s) from the first set of search results, the search result(s) being associated with a set of factors, the response indicating a level of interest in the search result(s). The server adjusts the parameters in the set of parameters or adjusts the weights of the parameters based on the response to the search result(s). The server provides an output based on the adjusted parameters or the adjusted weights.

13 Claims, 3 Drawing Sheets

QUERY TERM WEIGHTING

TECHNICAL FIELD

The present disclosure generally relates to machines configured for query term weighting, including computerized variants of such special-purpose machines and improvements to such variants, and to the technologies by which such special-purpose machines become improved compared to other special-purpose machines that provide impersonation detection technology. In particular, the present disclosure addresses systems and methods for query term weighting.

BACKGROUND

A user may enter a query with multiple terms, some terms being more important to the user than others. Determining which terms are important, and adjusting the results of the query accordingly, may be desirable.

BRIEF DESCRIPTION OF THE DRAWINGS

Some embodiments of the technology are illustrated, by way of example and not limitation, in the figures of the accompanying drawings.

DETAILED DESCRIPTION

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

Some aspects of the technology described herein address the problem in the computer arts of weighting parameters in a query that includes multiple parameters. This problem may be solved using the system shown in FIG. 1 or using another system with different machines. In some cases, the server conducting a search based on the query receives feedback from a client device, and adjusts the weight(s) of the parameter(s) in the query based on the feedback.

According to some aspects, a server receives, from a client device, a search query for employment candidates. The search query includes a set of parameters. Each parameter in the set of parameters has a weight. The server generates, from a data repository storing records associated with professionals, a first set of search results based on the set of parameters and the weights of the parameters in the set. The server transmits, to the client device, the first set of search results. The server receives, from the client device, a response to search result(s) from the first set of search results. The search result(s) are associated with a set of factors. The response indicates a level of interest in the search result(s). For example, the response may indicate that the user of the client device is interested in the search result(s), is not interested in the search result(s), or has ignored the search result(s). The server adjusts the parameters in the set of parameters or adjusts the weights of the parameters based on the response to the search result(s). The server provides an output based on the adjusted parameters or the adjusted weights.

Interest or disinterest in a search result may be indicated in any manner. In some cases, the user of the client device may indicate that she is interested in the search result by selecting the search result, viewing contact information for the search result, requesting that a person associated with the search result apply for a position, inviting the person to an interview, giving the person a job offer, and the like. The user may indicate that she is disinterested by notifying the server that the person is not a good fit based on an initial review of the search result or a communication (e.g., initial call or interview) with the person.

Figure 1:
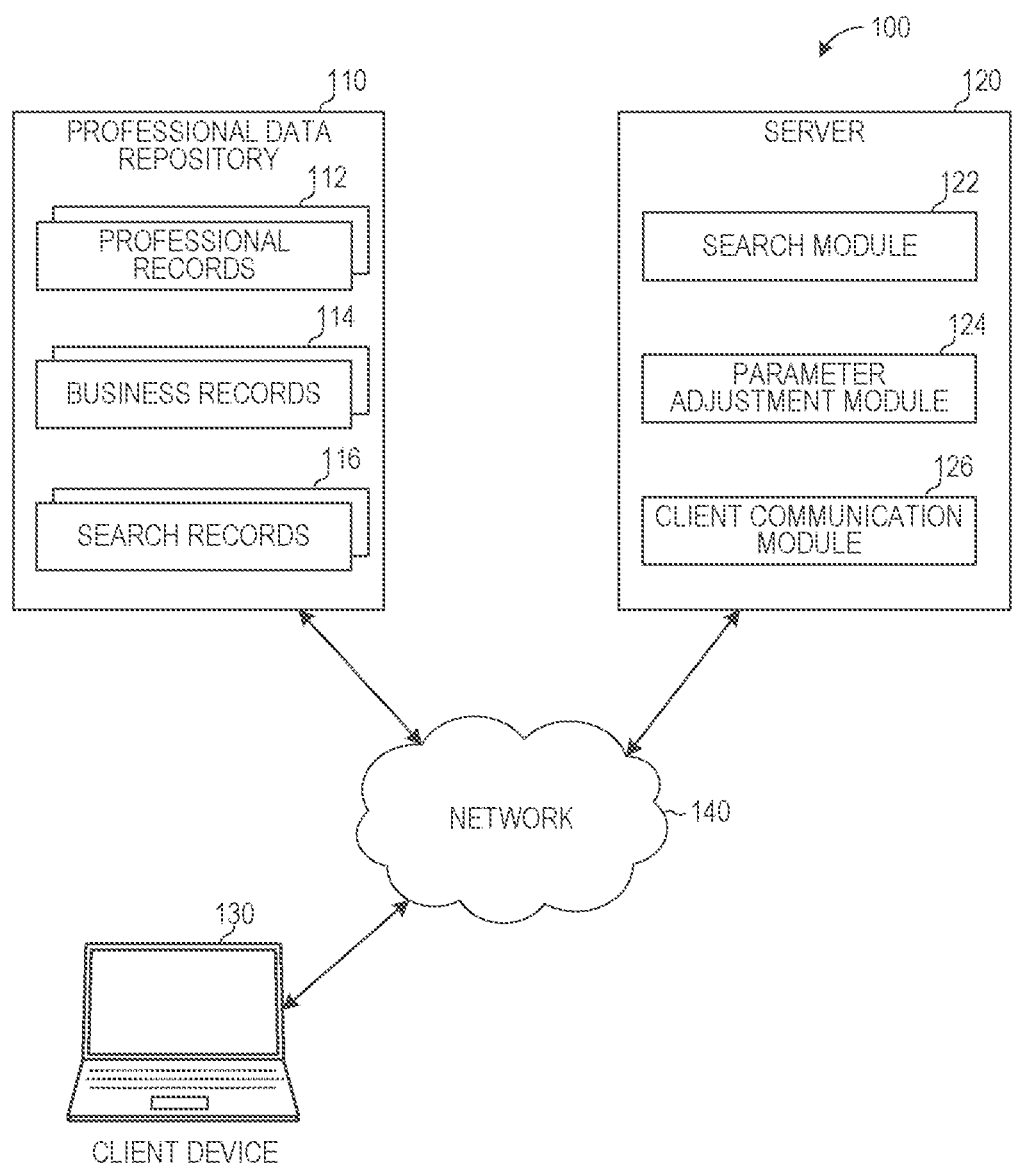
FIG. 1 illustrates an example system in which query term weighting may be implemented, in accordance with some embodiments.

FIG. 1 illustrates an example system 100 in which query term weighting may be implemented, in accordance with some embodiments. As shown, the system 100 includes a professional data repository 110, a server 120, and a client device 130 communicating with one another via a network 140. The network 140 may include one or more of the Internet, an intranet, a local area network, a wide area network, wired network, a wireless network, a cellular network, a virtual private network (VPN), and the like. While the system 100 is illustrated as including a single professional data repository 110, server 120, and client device 130, the technology described herein may also be implemented with multiple professional data repositories, servers, or client devices.

As shown, the professional data repository 110 stores professional records 112 business records 114, and search records 116. The professional records 112 may be records associated with professionals stored in a professional networking service, an Applicant Tracking System (ATS) or similar. Each professional record 112 may include one or more of: a name, a postal address, a telephone number, an email address, a current or past employer, a current or past educational institution and degree, a skill, an area of interest or expertise, and the like. The business records 114 may be generated via the professional networking service. Each business record 114 may be a record associated with a business. Each business record 114 may include one or more of: a name, a postal address, a telephone number, an email address, an industry, an open position, a filled position, and the like. The search records 116 are records of searches. Each search record 116 may include the parameter(s) or weight(s) of the parameter(s) in the search. The search records 116 may be generated via the server 120.

As shown, the server 120 includes a search module 122, a parameter adjustment module 124, and a client communication module 126. In some implementations, the server 120 receives, from the client device 130 and using the search module 122, a search query for employment candidates. The search query includes a set of parameters. Each parameter in the set of parameters has a weight. The server 120, using the search module 122, generates, from the professional data repository 110 storing the professional records 112 associated with professionals, a first set of search results based on the set of parameters and the weights of the parameters in the set. The server 120, using the client communication module 126, transmits, to the client device 130, the first set of search results. The server 120 receives, from the client device 130 using the client communication module 126, a response to search result(s) from the first set of search results. The search result(s) are associated with a set of factors. The response indicates a level of interest in the search result(s). For example, the response may indicate that, the user of the client device 130 is interested in the search result(s), is not interested in the search result(s), or has ignored the search result(s). The server 120 adjusts, using the parameter adjustment module 124, the parameters in the set of parameters or adjusts the weights of the parameters based on the response to the search result(s) received from the client device 130. The server 120 provides, using the client communication module 126, an output based on the adjusted parameters or the adjusted weights.

The client device 130 may be any computing device. For example, the client device 130 may include a laptop, a desktop, a mobile phone, a tablet computer, a smart watch, a smart television, a personal digital assistant, a smart television, and the like. While a single client device 130 is illustrated, the technology described herein may be implemented with multiple client devices.

FIG. 1 illustrates one possible architecture of the professional data repository 110 and the server 120. However, it should be noted that different architectures for these machines may be used in conjunction with the technology described herein. Furthermore, in some cases, the technology described herein may be implemented using machines different from those show in FIG. 1.

Figure 2:
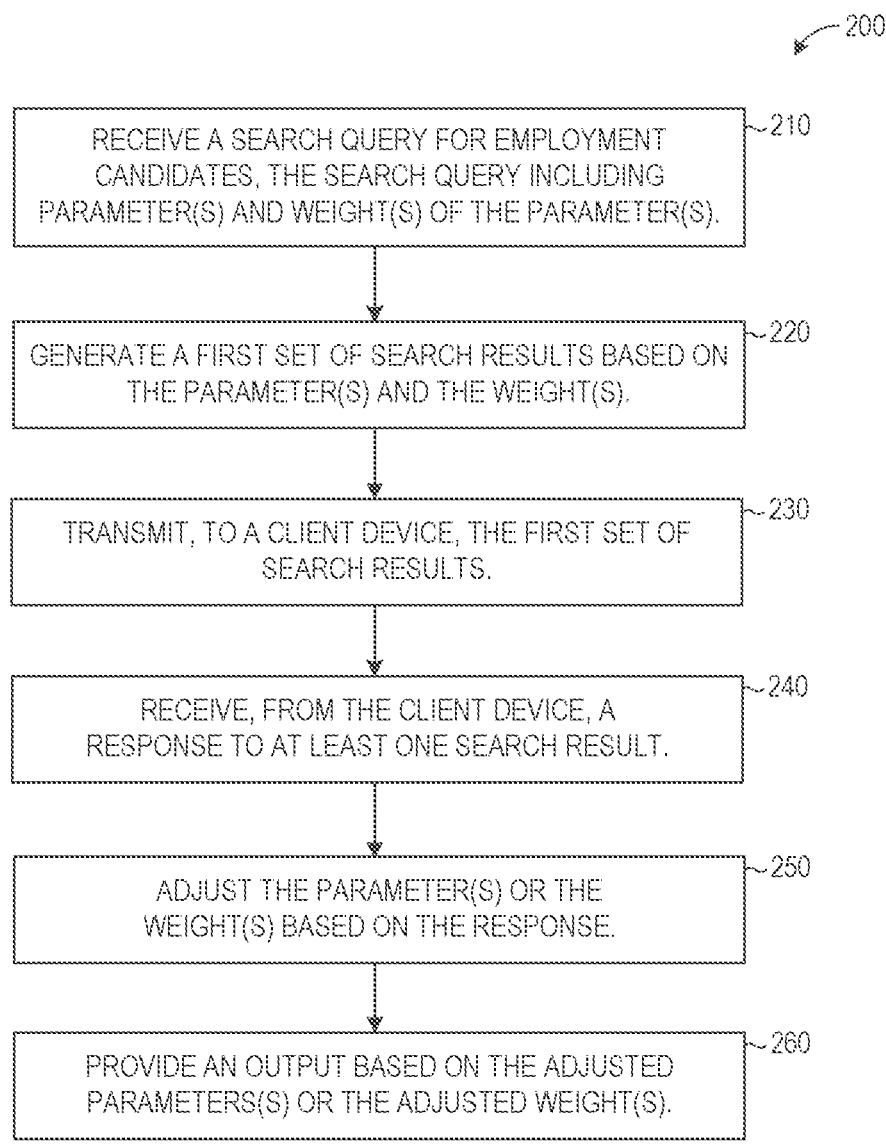
FIG. 2 is a flow chart illustrating an example method for query term weighting, in accordance with some embodiments.

FIG. 2 is a flow chart illustrating an example method 200 for query term weighting, in accordance with some embodiments. The method 200 is described here as being implemented within the system 100 of FIG. 1. However, the operations of the method 200 may also be implemented in other systems with different machines from those shown in FIG. 1.

At operation 210, the server 120 receives, from the client device 130, a search query for employment candidates. The search query includes a set of parameters, for example, "programmer," "Java," "C++," and "San Francisco." Each parameter may be associated with a weight. For example, each of the parameters may have a weight of 25, indicating that each parameter is equally important. The parameters may include skills (e.g., "real estate sales," "article editing"), prior work experience (e.g., "five years of experience as a real estate broker"), or prior education (e.g., "Bachelor's Degree," "Ivy League").

At operation 220, the server 120 generates, from the professional data repository 110 storing records associated with professionals, a first set of search results based on the set of parameters and the weights of the parameters in the set. For example, the first set of search results may include professional records 112 related to programmers from San Francisco who have the skills "Java." or "C++."

At operation 230, the server 120 transmits, to the client device 130, the first set of search results.

At operation 240, the server 120 receives, from the client device 130, a response to search result(s). The search result(s) are associated with a set of factors. The response indicates a level of interest in the search result(s). For example, the response may indicate that the user of the client device 130 is interested in the search result(s) (e.g., a positive response), is not interested in the search result(s) (e.g., a negative response), or has ignored the search result(s) (e.g., a neutral response).

A positive response may include communication, to the server 120, that any positive action in hiring a candidate associated with a search result (e.g., corresponding to the professional record 112 of the search result) has taken place. Examples of positive responses include: selecting a link for more information about the search result, obtaining contact information for a candidate associated with the search result, noting that the candidate has been invited to interview, noting that the candidate has received an offer, noting that the candidate has accepted the offer, noting that the candidate has started work at a business associated with the user of the client device 130, and noting that the candidate received good reviews from the business. A negative response may include communication, to the server 120, that any negative action in hiring the candidate has taken place. Examples of negative responses include: indicating disinterest in the search result, indicating a decision not to proceed with the candidate's application for the job (e.g., before or after an interview), or receiving an indication that the candidate started work at the business but was not a good fit.

At operation 250, the server 120 adjusts the parameters in the set of parameters or adjusts the weights of the parameters based on the response to the search result(s). For example, if the user of the client device 130 indicates interest in multiple search results that have the skill "Java" and indicates disinterest in search results that lack the skill "Java," the weight of the skill "Java" may be increased. Conversely, if the user's interest is determined to be independent of the skill "C++" (e.g., 60% of the search results have the skill "C++," and the same percentage of the search results in which the user is interested have that skill), the weight of the skill may be decreased or the parameter "C++" may be removed from the search query.

In some examples, the server 120 determines that the response to the search result(s) is a positive response (e.g., an indication of interest). The server 120 increases a weight of a parameter based on the response to the search result(s) being associated with the parameter and based on multiple other search results in the first set of search results not being associated with the parameter. In some examples, the server 120 determines that the response to the search result(s) is a negative response (e.g., an indication of disinterest). The server 120 decreases a weight of a parameter based on the response to the search result(s) being associated with the parameter and based on multiple other search results in the first set of search results not being associated with the parameter.

In some cases, the search result(s) include multiple search results having a positive response and multiple search results having a negative response or a neutral response. To adjust the parameters in the set of parameters or adjust the weights of the parameters based on the response to the search result(s), the server 120 determines that a first parameter appears in a higher ratio in the multiple search results having the positive response than in the multiple search results having the negative response or the neutral response. The server 120 increases a weight of the first parameter based on the higher ratio.

In some cases, the search result(s) include multiple search results having a positive response and multiple search results having a negative response or a neutral response. To adjust the parameters in the set of parameters or adjust the weights of the parameters based on the response to the search result(s), the server 120 determines that a second parameter appears in a lower ratio in the multiple search results having the positive response than in the multiple search results having the negative response or the neutral response. The server decreases a weight of the second parameter based on the lower ratio.

In some cases, the user of the client device 130 may be prompted to specify why he/she provided a positive or negative response to a search result. For example, the user may specify that she provided a negative response to a search result due to an industry associated with the search result being "banking" rather than "software." In this case, the search parameter "industry-software" may be added to the search query, and search results associated with "industry-software" may be boosted.

The parameters and weights may further be adjusted based on the business records 114 or the search records 116. For example, if searches associated with the business for which the user of the client device 130 is searching typically had higher weights for the skill "Java," the weight for the skill "Java" may be increased.

At operation 260, the server 120 provides (e.g., to the client device 130) an output based on the adjusted parameters or the adjusted weights. The output may include the adjusted parameters or the adjusted weights themselves, which may be presented for approval by the user of the client device 130. Alternatively, the output may include a second set of search results. The second set of search results is generated based on the adjusted set of parameters or the adjusted weights, for example, by searching the professional data repository 110. In some examples, the output includes the first set of search results of the original search (from operation 220) reordered based on the adjusted parameters or the adjusted weights.

The technology is described herein in the professional networking and employment candidate search context. However, the technology described herein may be useful in other contexts also. For example, the technology described herein may be useful in any other search context. In some embodiments, the technology described herein may be applied to a search for a mate in a dating service or a search for a new friend in a friend-finding service.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-2 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "Internet of Things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Example Machine Architecture and Machine-Readable Medium

Figure 3:
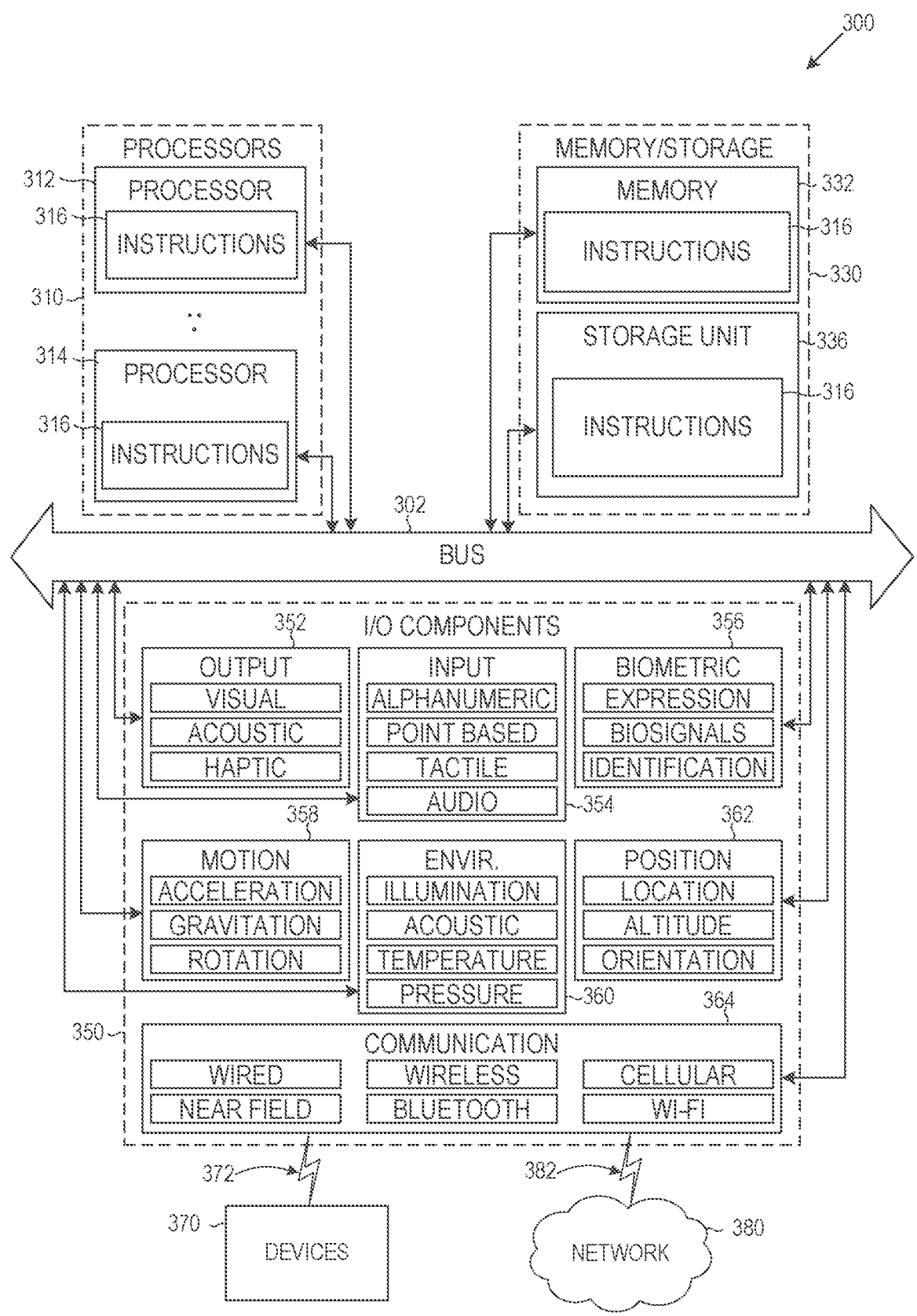
FIG. 3 is a block diagram illustrating components of a machine able to read instructions from a machine-readable medium and perform any of the methodologies discussed herein, in accordance with some embodiments.

FIG. 3 is a block diagram illustrating components of a machine 300, according to some example embodiments, able to read instructions from a machine-readable medium (e.g., a machine-readable storage medium) and perform any one or more of the methodologies discussed herein. Specifically, FIG. 3 shows a diagrammatic representation of the machine 300 in the example form of a computer system, within which instructions 316 (e.g., software, a program, an application, an apples, an app, or other executable code) for causing the machine 300 to perform any one or more of the methodologies discussed herein may be executed. The instructions 316 transform the general, non-programmed machine into a particular machine programmed to carry out the described and illustrated functions in the manner described. In alternative embodiments, the machine 300 operates as a standalone device or may be coupled (e.g., networked) to other machines. In a networked deployment, the machine 300 may operate in the capacity of a server machine or a client machine in a server-client network environment, or as a peer machine in a peer-to-peer (or distributed) network environment. The machine 300 may comprise, but not be limited to, a server computer, a client computer, PC, a tablet computer, a laptop computer, a netbook, a set-top box (SIB), a personal digital assistant (PDA), an entertainment media system, a cellular telephone, a smart phone, a mobile device, a wearable device (e.g., a smart watch, a smart home device (e.g., a smart appliance), other smart devices, a web appliance, a network router, a network switch, a network bridge, or any machine capable of executing the instructions 316, sequentially or otherwise, that specify actions to be taken by the machine 300. Further, while only a single machine 300 is illustrated, the term "machine" shall also be taken to include a collection of machines 300 that individually or jointly execute the instructions 316 to perform any one or more of the methodologies discussed herein.

The machine 300 may include processors 310, memory/storage 330, and I/O components 350, which may be configured to communicate with each other such as via a bus 302. In an example embodiment, the processors 310 (e.g., Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 312 and a processor 314 that may execute the instructions 316. The term "processor" is intended to include multi-core processors that may comprise two or more independent processors (sometimes referred to as "cores") that may execute instructions 316 contemporaneously. Although FIG. 3 shows multiple processors 310, the machine 300 may include a single processor with a single core, a single processor with multiple cores (e.g., a multi-core processor), multiple processors with a single core, multiple processors with multiples cores, or any combination thereof.

The memory/storage 330 may include a memory 332, such as a main memory, or other memory storage, and a storage unit 336, both accessible to the processors 310 such as via the bus 302. The storage unit 336 and memory 332 store the instructions 316 embodying any one or more of the methodologies or functions described herein. The instructions 316 may also reside, completely or partially, within the memory 332, within the storage unit 336, within at least one of the processors 310 (e.g., within the processor's cache memory), or any suitable combination thereof, during execution thereof by the machine 300. Accordingly, the memory 332, the storage unit 336, and the memory of the processors 310 are examples of machine-readable media.

As used herein, "machine-readable medium" means a device able to store instructions instructions 316) and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 316. The term "machine-readable medium" shall also be taken to include any medium, or combination of multiple media, that is capable of storing instructions (e.g., instructions 316) for execution by a machine (e.g., machine 300), such that the instructions, when executed by one or more processors of the machine (e.g., processors 310), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 350 may include a wide variety of components to receive input, provide output, produce output, transmit information, exchange information, capture measurements, and so on. The specific I/O components 350 that are included in a particular machine will depend on the type of machine. For example, portable machines such as mobile phones will likely include a touch input device or other such input mechanisms, while a headless server machine will likely not include such a touch input device. It will be appreciated that the I/O components 350 may include many other components that are not shown in FIG. 3. The I/O components 350 are grouped according to functionality merely for simplifying the following discussion and the grouping is in no way limiting. In various example embodiments, the I/O components 350 may include Output components 352 and input components 354. The output components 352 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 354 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 350 may include biometric components 356, motion components 358, environmental components 360, or position components 362, among a wide array of other components. For example, the biometric components 356 may include components to detect expressions (e.g., hand expressions, facial expressions, vocal expressions, body gestures, or eye tracking), measure biosignals blood pressure, heart rate, body temperature, perspiration, or brain waves), identify a person (e.g., voice identification, retinal identification, facial identification, fingerprint identification, err electroencephalogram based identification), and the like. The motion components 358 may include acceleration sensor components (e.g., accelerometer), gravitation sensor components, rotation sensor components (e.g., gyroscope), and so forth. The environmental components 360 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 362 may include location sensor components Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 350 may include communication components 364 operable to couple the machine 300 to a network 380 or devices 370 via a coupling 382 and a coupling 372, respectively. For example, the communication components 364 may include a network interface component or other suitable device to interface with the network 380. In further examples, the communication components 364 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 370 may be another machine or any of a wide variety of peripheral devices (e.g., a peripheral device coupled via a USB).

Moreover, the communication components 364 may detect identifiers or include components operable to detect identifiers. For example, the communication components 364 may include Radio Frequency Identification (RFID) tag reader components. NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 364, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 380 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 380 or a portion of the network 380 may include a wireless or cellular network and the coupling 382 may be a Code Division Multiple Access (CDMA) connection, a Global System for Mobile communications (GSM) connection, or another type of cellular or wireless coupling. In this example, the coupling 382 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal. Mobile Telecommunications System (UMTS), High Speed Packet Access (HSPA), Worldwide interoperability for Microwave Access (WiMAX), Long Term Evolution (LTE) standard, others defined by various standard-setting organizations, other long range protocols, or other data transfer technology.

The instructions 316 may be transmitted or received over the network 380 using a transmission medium via a network interface device (e.g., a network interface component included in the communication components 364) and utilizing any one of a number of well-known transfer protocols (e.g., HTTP). Similarly, the instructions 316 may be transmitted or received using a transmission medium via the coupling 372 (e.g., a peer-to-peer coupling) to the devices 370. The term "transmission medium" shall be taken to include any intangible medium that is capable of storing, encoding, or carrying the instructions 316 for execution by the machine 300, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting; sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fill within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   receiving, from a client device, a search query comprising a set of parameters, each parameter in the set of parameters having a weight;
   generating, from a data repository, a first set of search results based on the set of parameters and the weights of the parameters in the set;
   transmitting, to the client device, the first set of search results;
   receiving, from the client device, a response to a plurality of search results from the first set of search results, the response indicating a level of response in at least two of the plurality of search results, at least one of the plurality of search results having a positive response and at least one of the plurality of search resulting having a negative response;
   determining that a first parameter in the set of parameters appears in a higher ratio in the positive search results than in the negative search results while a second parameter in the set of parameters appears in a higher ratio in the negative search results than in the positive search results;
   in response to the determining, adjusting the weights of the parameters by increasing the weight of the first parameter and lowering the weight of the second parameter; and
   providing an output based on the adjusted parameters or the adjusted weights, wherein the output comprises the first set of search results reordered according to the adjusted parameters or the adjusted weights.

2. The method of claim 1, wherein the output comprises a second set of search results, the second set of search results being generated based on the adjusted set of parameters or the adjusted weights.

3. The method of claim 1, wherein the search query is for employment candidates, wherein the data repository stores records associated with professionals, wherein the parameters comprise skills, prior work experience, or prior education.

4. The method of claim 1, wherein adjusting the parameters in the set of parameters or adjusting the weights of the parameters based on the response to the at least one search result comprises:
   determining that the response to the at least one search result comprises a positive response; and
   increasing a weight of a parameter based on the response to the at least one search result being associated with the parameter and based on a plurality of search results in the first set of search results not being associated with the parameter.

5. The method of claim 1, wherein adjusting the parameters in the set of parameters or adjusting the weights of the parameters based on the response to the at least one search result comprises:
   determining that the response to the at least one search result comprises a negative response or a neutral response; and
   decreasing a weight of a parameter based on the response to the at least one search result being associated with the parameter and based on a plurality of search results in the first set of search results not being associated with the parameter.

6. A non-transitory machine-readable medium storing instructions which, when executed by processing circuitry of at least one machine, cause the processing circuitry to perform operations comprising:
   receiving, from a client device, a search query comprising a set of parameters, each parameter in the set of parameters having a weight;
   generating, from a data repository, a first set of search results based on the set of parameters and the weights of the parameters in the set;
   transmitting, to the client device, the first set of search results;

receiving, from the client device, a response to a plurality of search results from the first set of search results, the response indicating a level of response in at least two of the plurality of search results, at least one of the plurality of search results having a positive response and at least one of the plurality of search resulting having a negative response;

determining that a first parameter in the set of parameters appears in a higher ratio in the positive search results than in the negative search results while a second parameter in the set of parameters appears in a higher ratio in the negative search results than in the positive search results;

in response to the determining, adjusting the weights of the parameters by increasing the weight of the first parameter and lowering the weight of the second parameter; and providing an output based on the adjusted parameters or the adjusted weights, wherein the output comprises the first set of search results reordered according to the adjusted parameters or the adjusted weights.

7. The machine-readable medium of claim 6, wherein the output comprises a second set of search results, the second set of search results being generated based on the adjusted set of parameters or the adjusted weights.

8. The machine-readable medium of claim 6, wherein the search query is for employment candidates, wherein the data repository stores records associated with professionals, wherein the parameters comprise skills, prior work experience, or prior education.

9. The machine-readable medium of claim 6, wherein adjusting the parameters in the set of parameters or adjusting the weights of the parameters based on the response to the at least one search result comprises:
  determining that the response to the at least one search result comprises a positive response; and
  increasing a weight of a parameter based on the response to the at least one search result being associated with the parameter and based on a plurality of search results in the first set of search results not being associated with the parameter.

10. The machine-readable medium of claim 6, wherein adjusting the parameters in the set of parameters or adjusting the weights of the parameters based on the response to the at least one search result comprises:
  determining that the response to the at least one search result comprises a negative response or a neutral response; and
  decreasing a weight of a parameter based on the response to the at least one search result being associated with the parameter and based on a plurality of search results in the first set of search results not being associated with the parameter.

11. A system comprising:
processing circuitry; and
a memory storing instructions which, when executed by the processing circuitry, cause the processing circuitry to perform operations comprising:
  receiving, from a client device, a search query comprising a set of parameters, each parameter in the set of parameters having a weight;
  generating, from a data repository, a first set of search results based on the set of parameters and the weights of the parameters in the set;
transmitting, to the client device, the first set of search results;
  receiving, from the client device, a response to a plurality of search results from the first set of search results, the response indicating a level of response in at least two of the plurality of search results, at least one of the plurality of search results having a positive response and at least one of the plurality of search resulting having a negative response;
  determining that a first parameter in the set of parameters appears in a higher ratio in the positive search results than in the negative search results while a second parameter in the set of parameters appears in a higher ratio in the negative search results than in the positive search results;
  in response to the determining, adjusting the weights of the parameters by increasing the weight of the first parameter and lowering the weight of the second parameter; and
  providing an output based on the adjusted parameters or the adjusted weights, wherein the output comprises the first set of search results reordered according to the adjusted parameters or the adjusted weights.

12. The system of claim 11, wherein the output comprises a second set of search results, the second set of search results being generated based on the adjusted set of parameters or the adjusted weights.

13. The system of claim 11, wherein the search query is for employment candidates, wherein the data repository stores records associated with professionals, wherein the parameters comprise skills, prior work experience, or prior education.

* * * * *